United States Patent
Liang et al.

(10) Patent No.: US 11,376,581 B2
(45) Date of Patent: *Jul. 5, 2022

(54) FLOW CONTROL AND PROCESSING CARTRIDGE

(71) Applicant: Delta Electronics Int'l (Singapore) Pte Ltd, Singapore (SG)

(72) Inventors: Qian Liang, Singapore (SG); Hao Yu, Singapore (SG)

(73) Assignee: DELTA ELECTRONICS INT'L (SINGAPORE) PTE LTD, Singapore (SG)

(*) Notice: Subject to any disclaimer, the term of this patent is extended or adjusted under 35 U.S.C. 154(b) by 823 days.

This patent is subject to a terminal disclaimer.

(21) Appl. No.: 15/972,957

(22) Filed: May 7, 2018

(65) Prior Publication Data

US 2018/0250668 A1 Sep. 6, 2018

Related U.S. Application Data

(63) Continuation-in-part of application No. 15/700,791, filed on Sep. 11, 2017, now Pat. No. 10,654,038.
(Continued)

(30) Foreign Application Priority Data

Feb. 8, 2018 (SG) .............................. 10201801084S

(51) Int. Cl.
*B01L 3/00* (2006.01)
*B01L 7/00* (2006.01)
*G01N 21/64* (2006.01)

(52) U.S. Cl.
CPC ......... *B01L 3/502* (2013.01); *B01L 3/502707* (2013.01); *B01L 3/502715* (2013.01);
(Continued)

(58) Field of Classification Search
CPC ......... B01L 3/502707; B01L 3/502715; B01L 3/502; B01L 7/00; B01L 2300/1827;
(Continued)

(56) References Cited

U.S. PATENT DOCUMENTS

| | | | |
|---|---|---|---|
| 6,783,736 | B1 | 8/2004 | Taylor et al. |
| 8,048,386 | B2 | 11/2011 | Dority et al. |

(Continued)

FOREIGN PATENT DOCUMENTS

| | | |
|---|---|---|
| CN | 101675170 A | 3/2010 |
| CN | 101748212 A | 6/2010 |

(Continued)

*Primary Examiner* — Gautam Prakash
(74) *Attorney, Agent, or Firm* — Kirton McConkie; Evan R. Witt

(57) ABSTRACT

A flow control and processing cartridge used in a nucleic acid analysis apparatus includes a cartridge body and a reaction chip. The cartridge body includes plural chambers for storing at least one sample and plural biochemical reagents and buffers, and plural channels connected with the plural chambers. The reaction chip is in conjunction with the cartridge body and includes plural detection wells, at least one main fluid channel connected with the detection wells and adapted to dispense the sample into the detection wells, and at least one gas releasing channel connected with the detection wells and adapted to release gas from the detection wells.

17 Claims, 15 Drawing Sheets

Related U.S. Application Data

(60) Provisional application No. 62/393,211, filed on Sep. 12, 2016, provisional application No. 62/393,223, filed on Sep. 12, 2016.

(52) U.S. Cl.
CPC ........... *B01L 7/00* (2013.01); *B01L 2200/027* (2013.01); *B01L 2200/0684* (2013.01); *B01L 2200/147* (2013.01); *B01L 2300/0654* (2013.01); *B01L 2300/08* (2013.01); *B01L 2300/1811* (2013.01); *B01L 2300/1816* (2013.01); *B01L 2300/1827* (2013.01); *B01L 2300/1844* (2013.01); *B01L 2300/1866* (2013.01); *B01L 2300/1872* (2013.01); *G01N 21/645* (2013.01); *G01N 2021/6417* (2013.01)

(58) Field of Classification Search
CPC ......... B01L 2300/08; B01L 2300/1872; B01L 2200/147; B01L 2200/02; B01L 2300/1811; B01L 2300/0654; B01L 2300/1816; B01L 2300/1866; B01L 2200/0684; B01L 2300/1844; G01N 2021/6417; G01N 21/645
See application file for complete search history.

(56) References Cited

U.S. PATENT DOCUMENTS

| | | | |
|---|---|---|---|
| 8,441,629 | B2 | 5/2013 | Kolesnychenko et al. |
| 2004/0053290 | A1 | 3/2004 | Terbrueggen et al. |
| 2004/0161788 | A1 | 8/2004 | Chen et al. |
| 2005/0233324 | A1 | 10/2005 | Corbett et al. |
| 2006/0040303 | A1 | 2/2006 | Weilke |
| 2006/0204997 | A1 | 9/2006 | Macioszek et al. |
| 2006/0223061 | A1 | 10/2006 | Corbett et al. |
| 2007/0154922 | A1 | 7/2007 | Collier et al. |
| 2008/0153078 | A1 | 6/2008 | Braman et al. |
| 2010/0056383 | A1 | 3/2010 | Ririe et al. |
| 2010/0086990 | A1 | 4/2010 | Stanley et al. |
| 2011/0044865 | A1 | 2/2011 | Groisman et al. |
| 2011/0143968 | A1 | 6/2011 | Chen et al. |
| 2014/0004621 | A1 | 1/2014 | Cepheid |
| 2014/0051062 | A1 | 2/2014 | Vanapalli et al. |
| 2015/0099291 | A1 | 4/2015 | Ririe et al. |
| 2015/0135502 | A1 | 5/2015 | Rankin et al. |
| 2017/0015993 | A1 | 1/2017 | Chen et al. |

FOREIGN PATENT DOCUMENTS

| | | |
|---|---|---|
| CN | 201884767 U | 6/2011 |
| CN | 102341710 A | 2/2012 |
| CN | 102422143 A | 4/2012 |
| CN | 103424304 A | 12/2013 |
| CN | 104204229 A | 12/2014 |
| CN | 104630373 A | 5/2015 |
| CN | 204625604 U | 9/2015 |
| CN | 103831140 B | 12/2015 |
| CN | 105316224 A | 2/2016 |
| CN | 105828945 A | 8/2016 |
| CN | 106222069 A | 12/2016 |
| CN | 105940094 B | 2/2018 |
| EP | 1180135 B1 | 8/2005 |
| JP | 2012524242 A | 10/2012 |
| TW | M445583 U | 1/2013 |
| TW | 201333188 A | 8/2013 |
| TW | 201617454 A | 5/2016 |
| TW | 201704477 A | 2/2017 |
| WO | 9849340 | 11/1998 |
| WO | 2015057574 A1 | 4/2015 |

FLOW CONTROL AND PROCESSING CARTRIDGE

CROSS-REFERENCE TO RELATED APPLICATION

This application is a continuation-in-part of U.S. patent application Ser. No. 15/700,791 filed on Sep. 11, 2017 and issued as U.S. Pat. No. 10,654,038 on May 19, 2020, which claims the benefit of U.S. Provisional Application Ser. No. 62/393,211 filed on Sep. 12, 2016 and the benefit of U.S. Provisional Application Ser. No. 62/393,223 filed on Sep. 12, 2016, the entirety of which is hereby incorporated by reference. This application also claims the priority to Singapore Patent Application No. 10201801084S filed on Feb. 8, 2018, the entirety of which is hereby incorporated by reference.

FIELD OF THE INVENTION

The present invention relates to a flow control and processing cartridge, and more particularly to a flow control and processing cartridge used in a nucleic acid analysis apparatus.

BACKGROUND OF THE INVENTION

In vitro diagnostics (IVD) are increasingly important in modern medical practices. Recent years due to the demands of rapid diagnostics and decentralization of healthcare facilities, point-of-care-test (POCT) technologies, which enables on site detection with minimized trained technicians and human errors, are widely used in many applications. Generally POCT refers to simple medical tests that can be performed at the bedside, namely at the time and place of patient care, through a special designed device and a disposable test strip or cartridge. Various technologies have been developed to realize POCT including biochemistry, immunology and molecular biology. Among which, molecular based diagnostics is well acknowledged as the most promising candidates of the future market dominator.

Traditional molecular diagnostics is carried out in a central laboratory by well-trained technicians with a group of sophisticated equipment and following a series of pre-defined protocols. In additional, most central laboratory detections are operated for high throughput only when a large number of samples are collected due to the requirement of overall turnaround time and cost effectivity. Alternatively, POCT platforms integrate these bulk equipments within a desktop or handheld sized device, by emphasizing its portability and flexibility. Most molecular based POCT device have to work with a disposable cartridge when carrying out the diagnostics and virtually a part of functionalities previously existed in its counter-party bulk instruments are removed from the platform and they are incorporated within the fluid circuit in the disposable cartridge development.

As a result, the development of disposable cartridge is of vital importance to the POCT product development. Thus, there is a need of providing a cartridge design used for all-in-one nucleic acid analysis apparatus to realize and improve POCT.

SUMMARY OF THE INVENTION

An object of an embodiment of the present invention is to provide a flow control and processing cartridge used in the nucleic acid analysis apparatus to precisely control the flow direction and dynamic flow behaviors in the cartridge and thus to facilitate the nucleic acid amplification and detection.

According to an aspect of the embodiment of the present invention, there is provided a flow control and processing cartridge used in a nucleic acid analysis apparatus. The flow control and processing cartridge includes a cartridge body and a reaction chip. The cartridge body includes plural chambers for storing at least one sample and plural biochemical reagents and buffers, and plural channels connected with the plural chambers. The reaction chip is in conjunction with the cartridge body and includes plural detection wells, at least one main fluid channel connected with the detection wells and adapted to dispense the sample into the detection wells, and at least one gas releasing channel connected with the detection wells and adapted to release gas from the detection wells.

In an embodiment of the present invention, the gas releasing channel is much narrower than the main fluid channel.

In an embodiment of the present invention, the main fluid channel includes plural wide channel parts, plural narrow channel parts, and plural well inlet channels.

In an embodiment of the present invention, each of the plural wide channel parts is aligned with one of the plural detection wells and connected with the corresponding detection well through the corresponding well inlet channel, and each of the plural narrow channel parts is connected between two adjacent wide channel parts.

In an embodiment of the present invention, a flow resistance at the narrow channel part is higher than a combined flow resistance at the wide channel part and at the well inlet channel.

In an embodiment of the present invention, the flow resistance at the narrow channel part is 2 to 20 times higher than the combined flow resistance at the wide channel part and at the well inlet channel.

In an embodiment of the present invention, the flow resistance at the gas releasing channel is 2 to 500 times higher than the flow resistance at the narrow channel part.

In an embodiment of the present invention, the well inlet channel has a much smaller cross-section than the wide channel part.

In an embodiment of the present invention, the reaction chip is disposed on one side of the cartridge body.

In an embodiment of the present invention, each of the plural detection wells has at least one planar surface.

In an embodiment of the present invention, the shape of the reaction chip is substantially a regular polygon.

In an embodiment of the present invention, the reaction chip further includes at least one sample loading hole for adding the sample into the cartridge.

In an embodiment of the present invention, the reaction chip further includes plural sample loading holes for adding different samples into the cartridge.

In an embodiment of the present invention, the cartridge is mounted in a chamber of the nucleic acid analysis apparatus, and the reaction chip further includes at least one alignment slot capable of being aligned with at least one positioning component on the chamber.

In an embodiment of the present invention, the reaction chip includes at least one sample inlet, and the cartridge body includes at least one channel connected to the sample inlet for transferring the sample to the reaction chip.

In an embodiment of the present invention, the cartridge body further includes plural openings at a bottom surface thereof, and the openings are communicated with the chambers through the channels.

In an embodiment of the present invention, at least one of a bottom and a top of the detection well includes a light transmissive thin wall or thin film for passing light therethrough.

In an embodiment of the present invention, the detection well has a light transmissive front wall for passing light therethrough.

The above objects and advantages of the embodiments of the present invention become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of the embodiments of this invention are presented herein for purpose of illustration and description only; it is not intended to be exhaustive or to be limited to the precise form disclosed.

The embodiment of the present invention provides an all-in-one nucleic acid analysis apparatus with isothermal based amplification, which integrates a fluid delivery unit, a thermal unit, a rotational driven unit, and an optical unit on one single device, so that the processes of sample purification, nucleic acid extraction, nucleic acid amplification and optical detection may be performed on the all-in-one apparatus to realize nucleic acid analysis in real time. Particularly, the embodiment of the present invention provides a flow control and processing cartridge used in the nucleic acid analysis apparatus, which may precisely control the flow direction and dynamic flow behaviors in the cartridge to facilitate the following nucleic acid amplification and detection.

Figure 1:
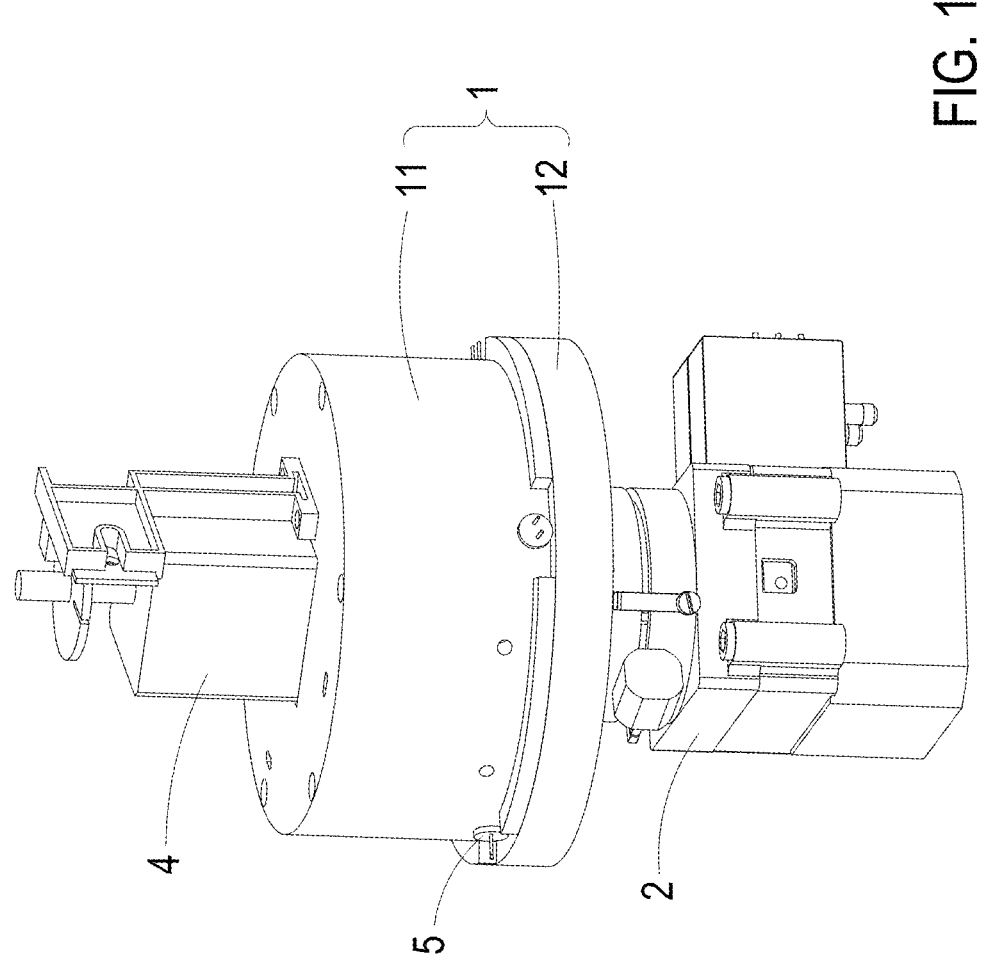
FIG. 1 shows a schematic view of the nucleic acid analysis apparatus according to the embodiment of the present invention.
Figure 2:
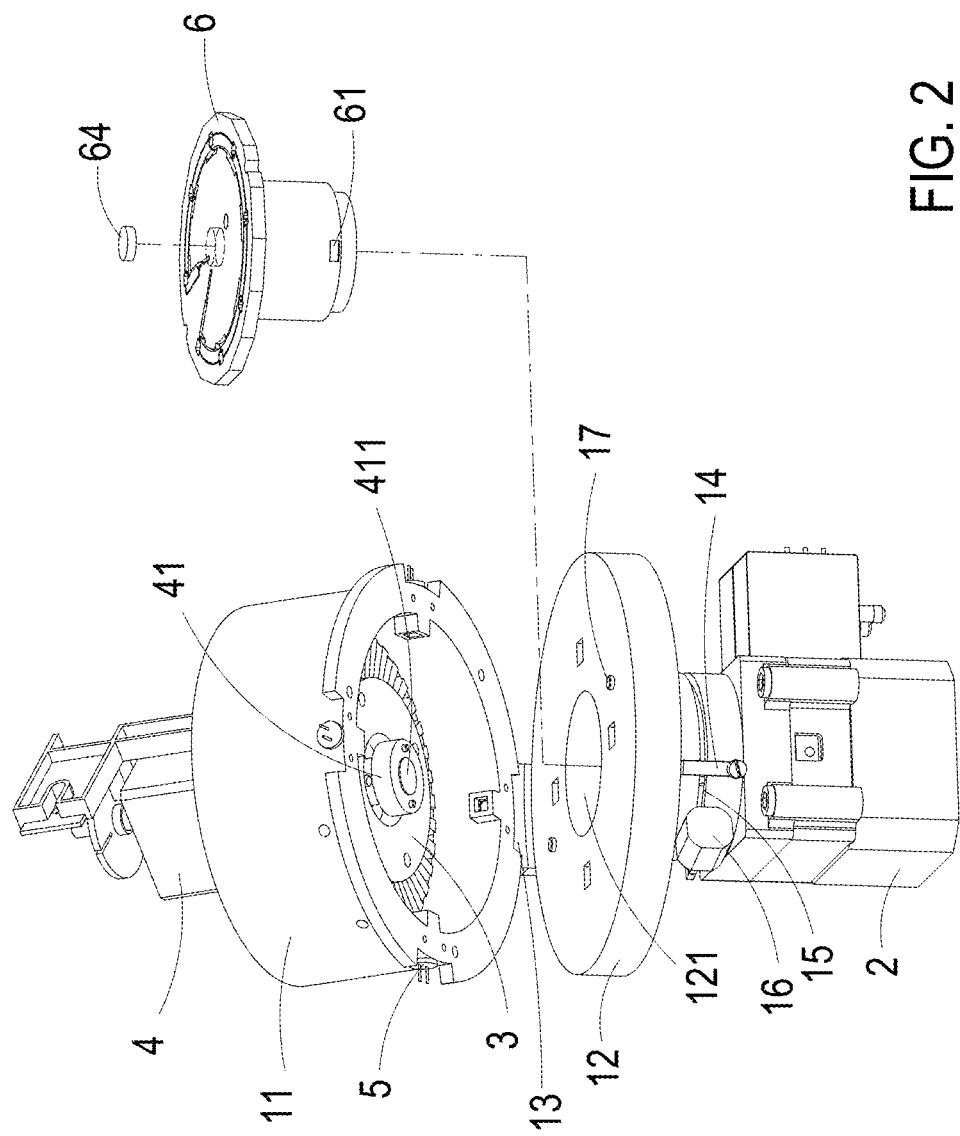
FIG. 2 shows the nucleic acid analysis apparatus of FIG. 1 with opened chamber.

FIG. 1 shows a schematic view of the nucleic acid analysis apparatus according to the embodiment of the present invention, and FIG. 2 shows the nucleic acid analysis apparatus of FIG. 1, wherein the nucleic acid analysis apparatus is opened, and the cartridge is moved out of the nucleic acid analysis apparatus. As shown in FIGS. 1 and 2, the nucleic acid analysis apparatus 100 includes a chamber 1, a fluid delivery unit 2, a thermal unit 3, a rotational driven unit 4, and at least one optical unit 5. The chamber 1 is able to be opened for mounting a flow control and processing cartridge 6 therein. In an embodiment, the flow control and processing cartridge 6 may be a disposable cartridge. The fluid delivery unit 2 is connected with the chamber 1 internally and adapted to transport reagents within the cartridge 6 for sample purification and/or nucleic acid extraction. The thermal unit 3 is disposed in the chamber 1 and adapted to provide predefined temperatures for nucleic acid amplification. The rotational driven unit 4 is connected with the chamber 1 and capable of rotating the cartridge 6 within the chamber 1 with a predefined program. In an embodiment, the rotational driven unit 4 is able to clamp the cartridge 6 on demand. The at least one optical unit 5 is disposed on the chamber 1 and includes plural optical components for detection, such as nucleic acid detection or sample reaction detection.

In an embodiment, the chamber 1 includes a top chamber 11 and a bottom chamber 12. The top chamber 11 and the bottom chamber 12 are connected through a hinge 13, but not limited thereto. The bottom chamber 12 has a cavity 121 specifically designed for mounting the cartridge 6 therein. The top chamber 11 can be opened, so that the cartridge 6 is able to be placed into the cavity 121 of the bottom chamber 12. When the top chamber 11 is closed, a confined space is formed in the chamber 1.

In an embodiment, the shape of the chamber 1 could be but not limited as cylindrical, spherical, cubic, conical or olivary, and the chamber 1 could be made but not limited by metal, ceramic, polymer, polymer compound, wood, glass, or other materials.

The bottom chamber 12 is connected with the fluid delivery unit 2 through tubing or channels. Once the cartridge 6 is mounted in the bottom chamber 12, the cartridge 6 is locked and forced to tightly contact the fluid delivery unit 2 without leakage. For example, the cartridge 6 is locked on the bottom chamber 12 by at least one fixing component, such as a clip but not limited thereto.

Figure 3:
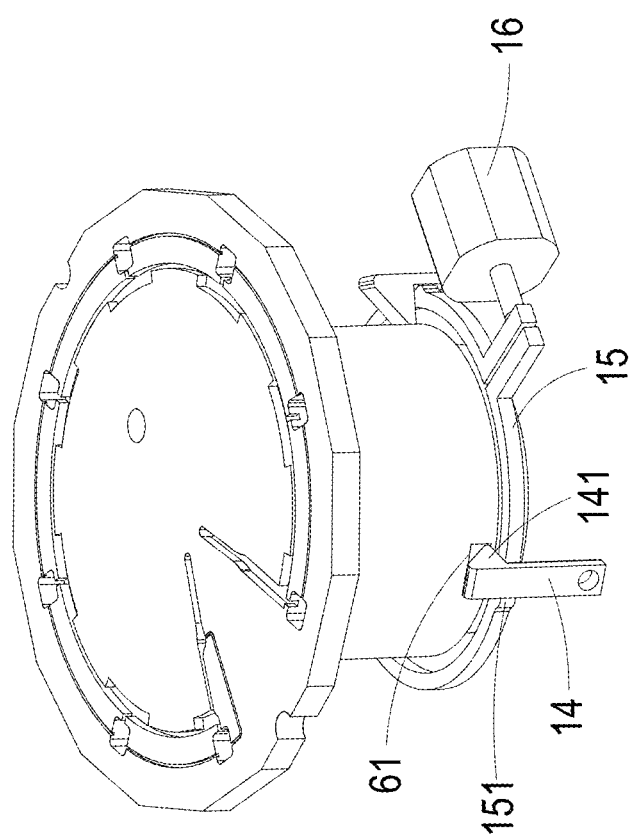
FIG. 3 shows the lock and release mechanism between the cartridge and the bottom chamber.

FIG. 3 shows the lock and release mechanism between the cartridge and the bottom chamber. As shown in the embodiment of FIGS. 2 and 3, the cartridge 6 includes at least one lock slot 61 on its cylindrical body, and the bottom chamber 12 includes at least one clip 14, a release ring 15, and a release actuator 16. The clip 14 is fixed at the bottom and has a hook 141 on the top. The clip 14 could be made by polymer or metal strip with elasticity. When the cartridge 6 is placed into the cavity 121 of the bottom chamber 12, the user may push the cartridge 6 downwardly to make the hook 141 of clip 14 be engaged and locked with the lock slot 61 of the cartridge 6, and thus make the cartridge 6 tightly contact the fluid delivery unit 2. The release ring 15 surrounds the cylindrical body of the cartridge 6, and leans against the bottom surface of the hook 141. The release ring 15 is able to slide within a certain distance, and is connected with the release actuator 16, such as a solenoid actuator. When the cartridge 6 needs to be released, the release actuator 16 is triggered to drag the release ring 15, then the convex structure 151 on the release ring 15 pushes the clip 14 to separate the hook 141 apart from the lock slot 61 and therefore release the cartridge 6.

In an embodiment, the clip 14 could be operated by user manually or by the device automated on demand. Certainly, the lock and release mechanism is not limited to the clip 14 described above, and may be other fixing component as long as it is able to lock and release the cartridge 6.

Figure 4:
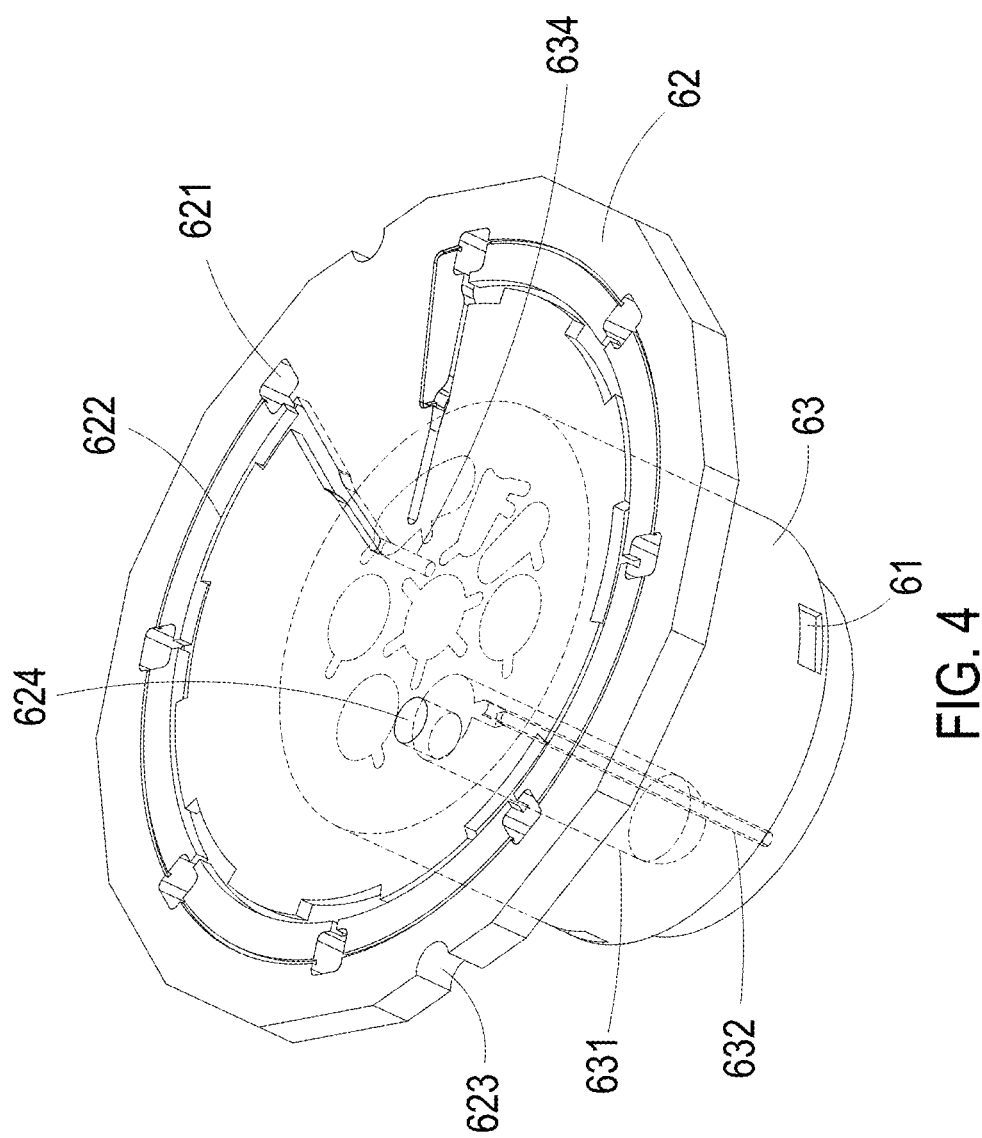
FIGS. 4 and 5 show different views of the cartridge.
Figure 5:
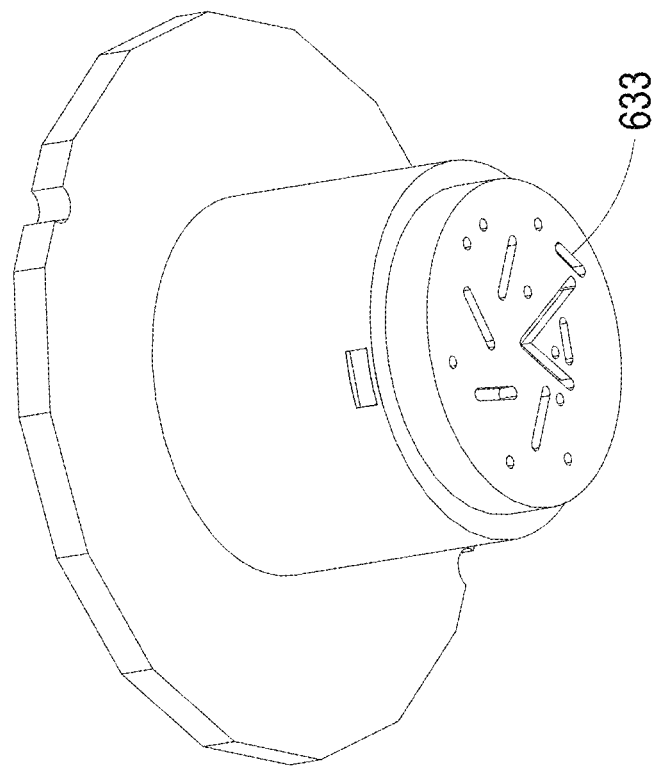

FIGS. 4 and 5 show different views of the cartridge. As shown in FIGS. 4 and 5, the cartridge 6 includes a planar reaction chip 62 for nucleic acid amplification and detection, and a cartridge body 63 including plural chambers 631, and plural channels 632 connected with the chambers 631 for fluid delivery in sample processing, purification and nucleic acid extraction (only parts of the chambers 631 and the channels 632 are shown in FIG. 4 to avoid unclear drawing caused by too many lines). Biochemical reagents and buffers are pre-loaded within the cartridge body 63 and are stored at the chambers 631. The sample is added into the cartridge 6 through a sample loading hole 624 on the top surface of the reaction chip 62 and is stored in one of the chambers 631. In an embodiment, the cartridge body 63 is but not limited to a cylindrical body. The cartridge body 63 further includes plural openings 633 at the bottom surface of the cartridge body 63, and the openings 633 are communicated with the chambers 631 through the channels 632. The shape of the openings 633 may be but not limited to circular, rectangular or other regular or irregular shape.

In the embodiment, the reaction chip 62 includes a planar fluidic chip and is disposed on one side of the cartridge body 63, such as the top of the cartridge body 63. The reaction chip 62 is in conjunction with the cartridge body 63, and includes plural detection wells 621 for nucleic acid amplification and detection, at least one main fluid channel 622 connected with the detection wells 621 and adapted to dispense the sample into the detection wells 621, and at least one gas releasing channel 74 (shown in FIG. 6) connected with the detection wells 621 and adapted to release gas from the detection wells 621. In an embodiment, the detection wells 621 include reagents for nucleic acid amplification and/or detection. For example, the detection wells 621 may be coated with reagents for nucleic acid amplification and/or detection, such as reagents containing different fluorescent dyes.

In some embodiments, the material of the reaction chip 62 and the cartridge body 63 could be but not limited to metal, thermoplastic, glass, rubber and silicone. The cartridge body 63 could be rigid or deformable, depending on the fluid driven method.

In some embodiments, the reaction chip 62 and the cartridge body 63 might be manufactured by using but not limited to CNC machining, 3D printing (additive manufacturing), injection molding, layer-by-layer stacking, hot embossing, laser ablation, thermoforming, photolithography, soft lithography, e-beam lithography or any combinations of the above-mentioned.

In some embodiments, the reaction chip 62 and the cartridge body 63 are pre-bonded, by using but not limited to thermal bonding, solvent bonding, adhesive bonding, ultrasonic bonding, laser welding or any combinations of the above-mentioned, to form a permanent bonded structure. While in some embodiments, the reaction chip 62 and the cartridge body 63 are detached originally, and the user could combine them through the designed structures on each parts, for example by snap fitting or screwing.

The number of the detection wells 621 is not limited, and the apparatus could perform multiplexing nucleic acid analysis. In an embodiment, the shape of the reaction chip 62 is substantially a regular polygon, so that the reaction chip 62 has plural planar side surfaces to be in line with the optical unit 5 to facilitate light focusing. The number of planar side surfaces depends on the number of detection wells 621. Certainly, the shape of the reaction chip 62 is not limited to the regular polygon and it may also be circular or other shape, since the light could be focused on the sample in the detection well 621 by the arrangement of optical components of the optical unit 5.

In an embodiment, the reaction chip 62 further includes at least one alignment slot 623, and the bottom chamber 12 further include at least one positioning component 17 (as shown in FIG. 2). For example, the positioning component 17 includes a positioning pin. When the cartridge 6 is placed into the cavity 121 of the bottom chamber 12, the alignment slot 623 of the cartridge 6 is aligned with the positioning component 17 of the bottom chamber 12, which helps an easy cartridge loading, and accordingly, the cartridge 6 may be self-aligned with the fluid delivery unit 2 through channels or tubing on the bottom chamber 12, and each optical unit 5 is in line with one of the detection wells 621. In an embodiment, each of the detection wells 621 has at least one planar surface. For example, the detection well 621 may be rectangular-shaped and have one planar surface in line with a light source of the optical unit 5 and another planar surface in line with an optical detector of the optical unit 5, respectively, during nucleic acid detection.

During the operation, once the sample is loaded, the cartridge 6 is placed into the nucleic acid analysis apparatus 100, and the flow processing is carried out by the fluid delivery unit 2. The fluid delivery unit 2 works concurrently with the cartridge 6 to carry out sample purification, nucleic acid extraction and fluid delivery so as to have a fully automatic device. The fluid delivery could be realized but not limited by pneumatic, vacuum, plunger, chamber deformation, thermal-induced expansion, acoustics, centrifugal force or other methods as long as the sample processing is completed within the cartridge body 63.

In an embodiment, the flow is driven pneumatically through microchannels and holes. For example, the fluid delivery unit 2 is similar to the integrated fluidic module of U.S. patent application Ser. No. 15/217,511 filed on Jul. 22, 2016, which claims the priority to Singapore Patent Application No. 10201605723Y filed on Jul. 13, 2016, by the applicant of the present invention, the entire contents of which are incorporated herein by reference and are not redundantly described here. In brief, the fluid delivery unit 2 of the embodiment of the present invention includes the fluid manifold, the valve stator, the valve rotor, the valve housing and the fluid sources as disclosed in U.S. patent application Ser. No. 15/217,511. The fluid manifold includes plural microchannels for connecting with the chambers 631 of the cartridge 6 through the openings 633 and the channels 632. By the alignments of the through holes and/or grooves of the valve stator and the valve rotor, multi-way fluid path switching is realized when the valve rotor is rotated to different positions, so as to regulate the fluid operations in the cartridge 6. Thereby, the reagents stored within the cartridge 6 are able to be transported to desired locations through pneumatic force from pumps of the fluid delivery unit 2, so as to automatically perform the sample purification and the nucleic acid extraction. Certainly, the fluid delivery unit 2 is not limited to the above-mentioned design, and can be any other type as long as it is able to realize multiple fluid delivery and multi-way fluid path switching in the cartridge 6.

Figure 6:
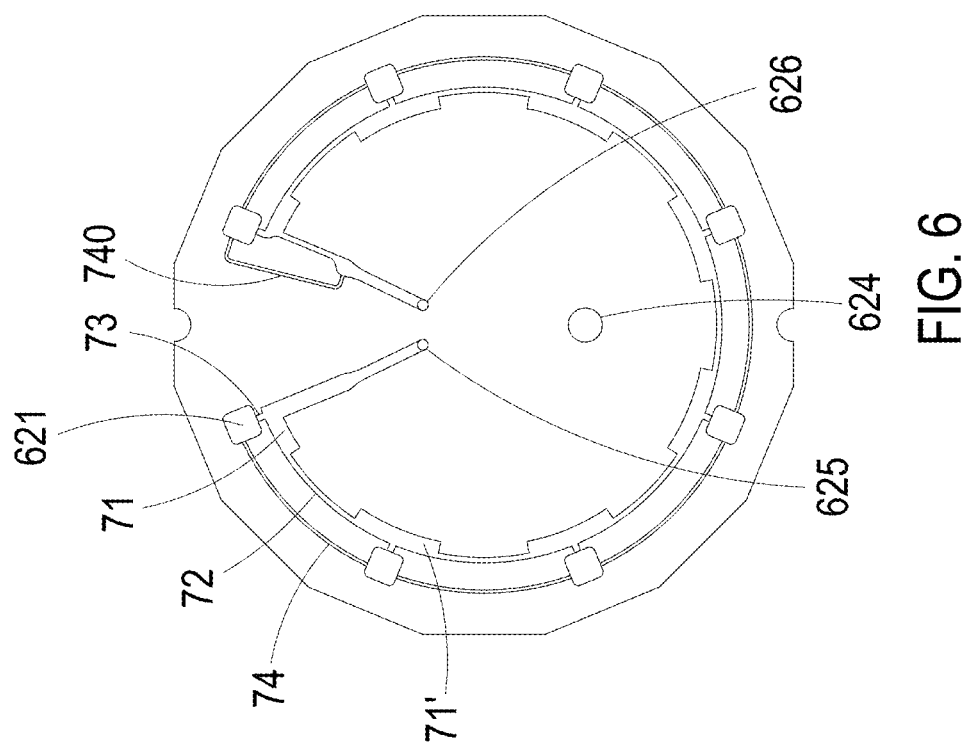
FIG. 6 shows a top view of the reaction chip.

After the sample purification and the nucleic acid extraction are completed, the sample with extracted nucleic acid is dispensed to the detection wells 621 of the cartridge 6 for following nucleic acid amplification and detection. FIG. 6 shows a top view of the reaction chip. The reaction chip 62 includes at least one sample inlet 625 and at least one sample outlet 626. The cartridge body 63 includes at least one channel 634 (shown in FIG. 4) which is connected to the sample inlet 625 of the reaction chip 62. Once the sample processing is completed, the sample with extracted nucleic acid is transferred to the reaction chip 62 through the channel 634 and the sample inlet 625 for nucleic acid amplification and detection.

In order to uniformly dispense the sample into each detection well 621 and fully fill the detection well 621 without gas bubble trapped, the main fluid channel 622 is specifically designed. As shown in FIGS. 4 and 6, the main fluid channel 622 includes plural wide channel parts 71, 71' (71' represents the next wide channel part), plural narrow channel parts 72, and plural short well inlet channels 73. Each wide channel part 71, 71' is aligned with a detection well 621 and connected with the detection well 621 through a corresponding well inlet channel 73, and each narrow channel part 72 is connected between two adjacent wide channel parts 71, 71'. Once the liquid sample is introduced from the sample inlet 625 by pressure difference, the liquid first fills the wide channel part 71 corresponding to the first detection well 621. Subsequently, the liquid further flows along the main fluid channel 622 and is retarded because of high flow resistance resulted from the suddenly shrunken channel cross-section. Meanwhile, the liquid enters the detection well 621 through the well inlet channel 73, and the residual gas in the detection well 621 is pushed out by the incoming flow from a gas releasing channel 74 towards the neighboring detection wells 621. Because the channel surfaces are originally or treated to be hydrophobic, the surface tension within the tiny channel essentially repels the liquid from flowing into it. As the gas releasing channel 74 is much narrower than all other channels 71, 71', 72 and 73, the liquid can hardly enters into the gas releasing channel 74. Therefore, residual gas existing at the gas releasing channel 74 also isolates each detection well 621 and prevents the sample from contamination between neighboring detection wells 621. Once the detection well 621 is fully filled, the flow overcomes the flow resistance of the narrow channel part 72 and then reaches the next wide channel part 71' corresponding to the next detection well 621. As a result, the next detection well 621 is filled, and these actions repeat until all the detection wells 621 are fully filled in sequence. Finally, the residual liquid is withdrawn from the main fluid channel 622, and an immiscible fluid, such as oil or liquid wax, is pumped into the main fluid channel 622 subsequently. During this step, the well inlet channel 73 serves as a capillary valve and prevents the sample from flowing out of the detection well 621. As a result, the detection wells 621 filled with purified samples are isolated, and they are sealed by the immiscible fluid to avoid contamination from each other and minimize sample evaporation during the amplification process.

In an embodiment, the gas releasing channel 74 may be directly connected with each detection well 621 without branches and substantially in a circular shape. Further, a last section 740 of the gas releasing channel 74 connects the last detection well 621 and the channel towards the sample outlet 626 for gas releasing of the last detection well 621.

According to the classical Hagen-Poiseuille equation, at low Reynolds number condition, the pressure driven flow in a rectangular channel is expressed by the following equation:

$$\Delta P = RQ = \alpha \mu QL/WH^3 \quad (1)$$

Where $\Delta P$ is the driven pressure gradient, R is the flow resistance, and Q is the volume flow rate. L, W, and H denote the fluid channel length, width, and height, respectively. $\mu$ is the fluid viscosity, and a is a dimensionless parameter depends on the aspect ratio, $$\alpha = 12[1-(192H/\pi^5 W)\tan h(\mu W/2H)]-1 \quad (2)$$

From equation (1) one can derive the flow resistance $$R = \Delta P/Q = 12\mu L/WH^3(1-0.63H/W) = \mu a \quad (3)$$

where $$a = 12L/WH^3(1-0.63H/W) \quad (4)$$

Figure 7:
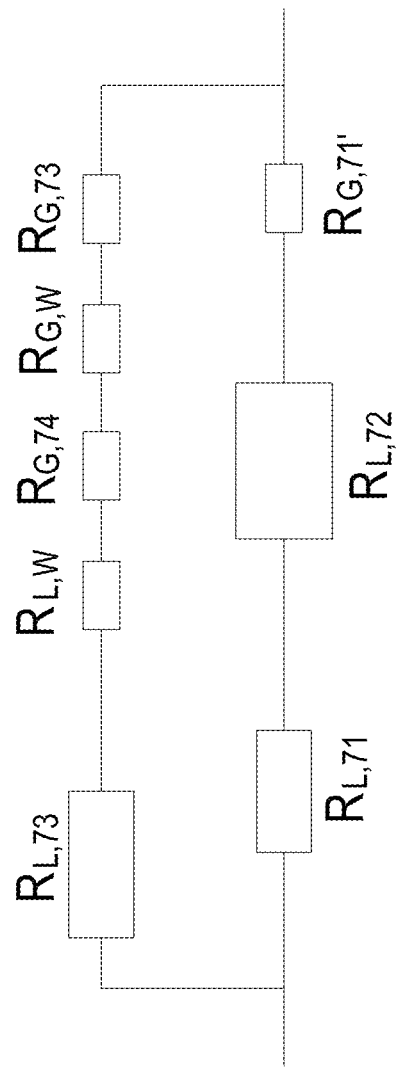
FIG. 7 shows the schematic flow circuit at the moment when the flow is passing through the wide channel part and entering the narrow channel part and the well inlet channel.

It is clearly indicated by equations (3) and (4) that the flow resistance straightforwardly depends on two factors, namely the fluid viscosity and the channel geometry. For a chosen fluid, one can estimate the flow resistance of the designed channel by calculating the parameter a and therefore use the resistance to estimate the time needed for a flow passing through the channel. In a fluidic circuit, the overall flow resistance follows Ohm's law. For example, when the liquid flows through the wide channel part 71 and is entering the narrow channel part 72, the high flow resistance at the narrow channel part 72 significantly retards the majority of the flow speed and therefore the flow switches to a low resistance path at the well inlet channel 73. The flow resistance at the narrow channel part 72 is higher than the combined flow resistance at the wide channel part 71 and at the well inlet channel 73, and generally, the former is 2 to 20 times higher than the latter. FIG. 7 shows the schematic flow circuit at the moment when the flow is passing through the wide channel part 71 and entering the narrow channel part 72 and the well inlet channel 73. The subscript L and G represent the liquid fluid and the gas fluid respectively, W represents the detection well 621, and 71 to 74 represent the different channel parts shown in FIG. 6. As the gas viscosity is normally thousand times lower than that of the liquid, the gas related flow resistances are negligible compared with the resistances of the same channels filled with the liquid. The above calculation is based on the assumption of high Weber number condition at which the fluid's inertia force is much stronger than the capillary force induced by surface tension. When withdrawing the flow after well dispensing, the flow speed could be well-controlled so that the capillary force plays a role to stop the flow at the well inlet channel 73.

Figure 8A:
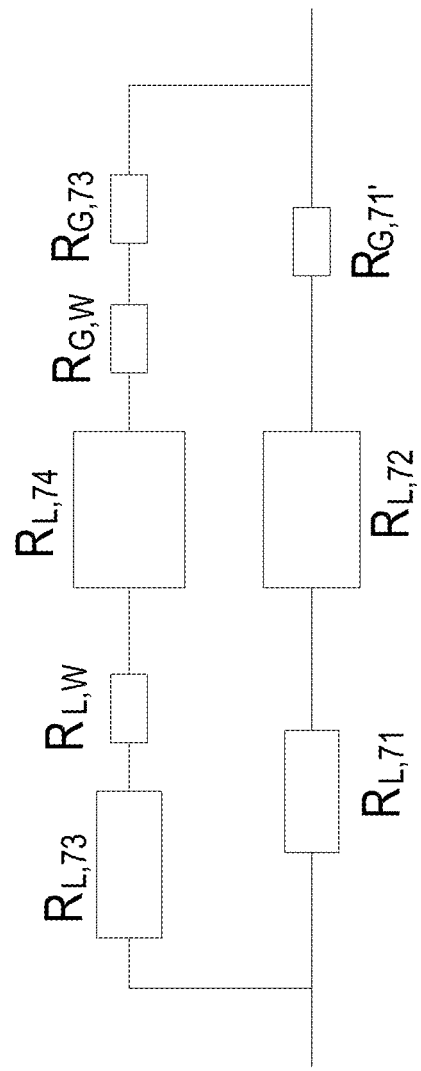
FIGS. 8A and 8B show the schematic flow circuit at the moment when the first detection well is filled.
Figure 8B:
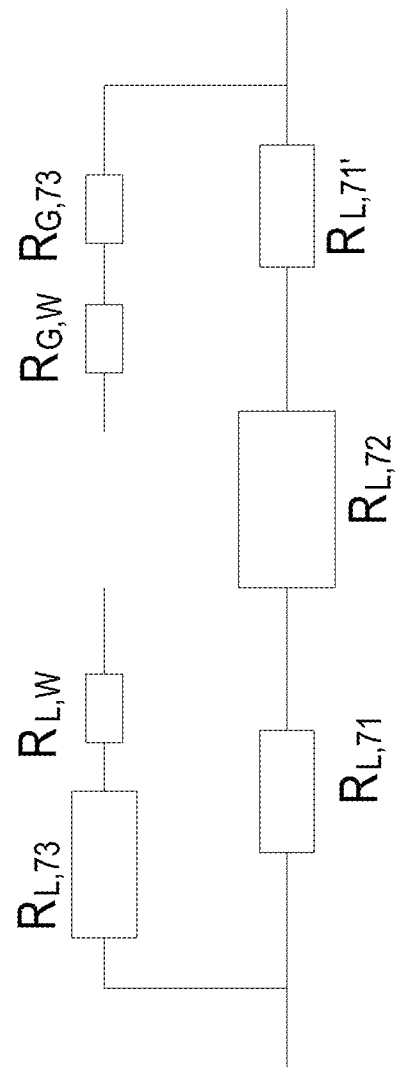

Once the dispensed sample occupies the detection well 621, the gas originally in the well is repelled toward the neighboring wells through the gas releasing channel 74. In order to minimize the liquid over propagation into the gas releasing channel 74, the cross-section of the gas releasing channel 74 is much smaller than all other channels. Namely, the gas releasing channel 74 is designed for releasing gas and with extremely high flow resistance for liquid flow, so the gas releasing channel 74 is selectively passing gas while rejecting liquid flow. FIGS. 8A and 8B show the schematic flow circuit at the moment when the first detection well 621 is filled. As shown in FIG. 8A, the flow resistance at the gas releasing channel 74 is much greater than all elsewhere, thus, it can be assumed that there is a break for liquid flow at this part, as shown in FIG. 8B. Generally, the flow resistance at the gas releasing channel 74 is 2 to 500 times higher than the flow resistance at the narrow channel part 72. At this condition, under the external driven pressure, the flow may slowly pass through the narrow channel part 72 and then arrive at the entrance of the next detection well 621. Because the path at the gas releasing channel 74 is interrupted, the only direction to fill the next detection well 621 is though the well inlet channel 73 at the next detection well 621.

By using the above method, the channel geometry could be carefully deigned to precisely control the flow direction and dynamic flow behaviors within the reaction chip 62. As for residual sample flow withdrawing, the flow speed could be carefully controlled in order to utilize the capillary valve. While in most instruments, the pumping pressure is limited within a certain range due to the hardware properties. By using this method, the channel geometry could be designed with calculated dynamic flow circuit at each stage, so that the withdrawing pressure is the same as the dispensing pressure by using the same pump. In other words, with well-designed channel geometry, the dispensing and withdrawing flow could be driven from the same source. In some embodiments, the channel geometries are not same at each detection well according to the pressure distribution within the system.

Figure 9:
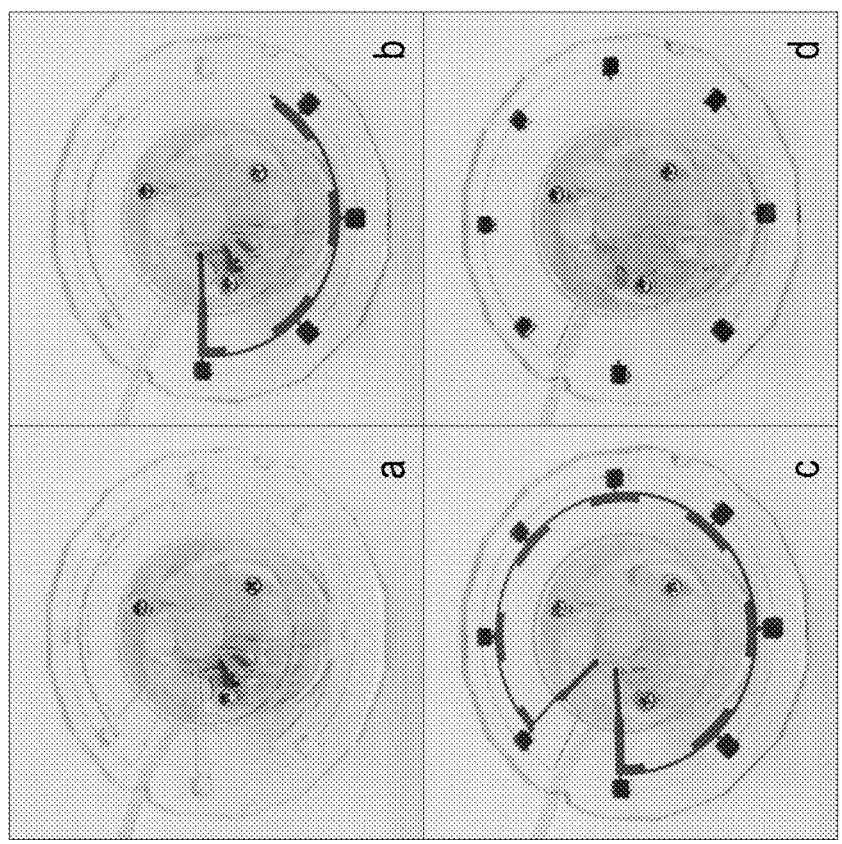
FIG. 9 shows the liquid dispensing and the oil sealing processes of the cartridge.

FIG. 9 shows the liquid dispensing and the oil sealing processes of the cartridge. The cartridge 6 was charged by using a piezoelectric micro-pump to transfer the liquid sample from the cartridge body 63 to the reaction chip 62 through the sample inlet 625. As shown in the subfigures a to c of FIG. 9, the liquid sample could be sequentially and smoothly dispensed to each detection well 621 through the wide channel parts 71, 71', the narrow channel parts 72 and the well inlet channels 73. After each detection well 621 is filled, the residual liquid sample is withdrawn through the sample outlet 626 to remove the liquid sample in the wide channel parts 71, 71' and the narrow channel parts 72 but retain the liquid sample within the detection wells 621, followed by isolating each detection well 621 with the immiscible oil or liquid wax, as shown in the subfigure d of FIG. 9. As the oil is light transmissive and its refractive index is close to the light transmissive reaction chip material (thermoplastic), although it is not readily to be observed, the main fluid channel 622 is 'hidden' in the subfigure d of FIG. 9, showing the successful oil sealing process. Therefore, it is clear that the flow in the reaction chip 62 could be precisely controlled by the designed channel geometry of the embodiment of the present invention.

In each detection well 621, dry reagents are pre-loaded so that each well serves as an independent reaction unit. In some embodiments, each reaction chip 62 includes 2 to 100 detection wells 621, and multiplexing detection is therefore realized. Once the sample is dispensed, the dry reagents are mixed and dissolved with the sample within the detection well 621. By well-controlling over the dispensing flow rate and the dissolving rate, the contamination among neighboring wells could be avoided. Alternatively, the dry reagents at each well are covered by nucleic acid friendly chemicals, such as paraffin. Once the dispensing is completed, the covering chemicals are melt at a certain temperature during heating and then the underlying reagents are released for mixing.

Figure 10:
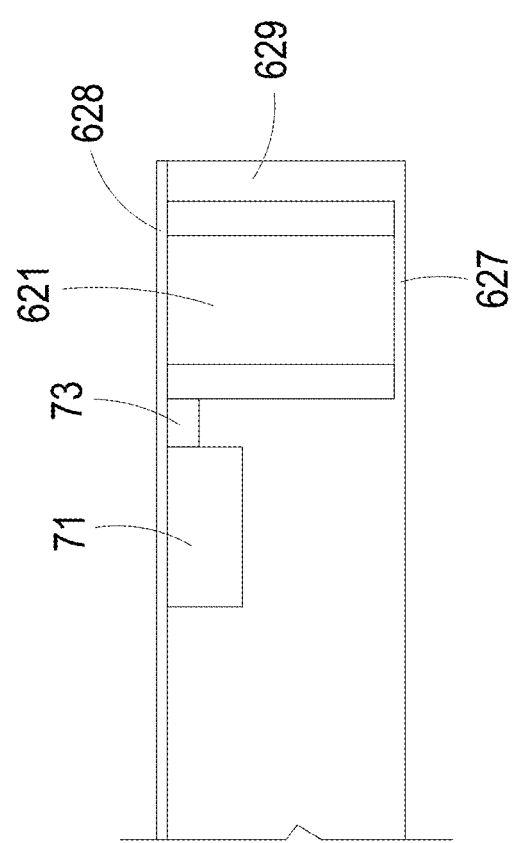
FIG. 10 shows the cross-sectional view of the detection well.

In some embodiments, each detection well 621 has a volume from 1 μL to 200 μL. The detection well 621 is designed to facilitate the optical detection. FIG. 10 shows the cross-sectional view of the detection well 621. The sample is dispensed from the wide channel part 71, 71' and charged to the detection well 621 through the well inlet channel 73. The well inlet channel 73 has a much smaller cross-section than the wide channel part 71, 71' in order to have a capillary valve for passive flow controlling. In some embodiments, the detection well 621 has a thin wall 627 on the bottom during manufacturing, and the top of the reaction chip 62 is sealed with a thin film 628 to have an enclosed well. In some embodiments, the reaction chip 62 has through detection wells 621 and they are sealed by a top thin film 628 and a bottom thin film 627. The bottom thin wall or film 627 includes an optical wall or film, which ensures the excitation light reaches the detection well 621 from the bottom thin wall or film 627 efficiently. At the same time, the detection well 621 has an optical front wall 629, so the fluorescent signal emitted from the sample could transmit through the front wall 629 of the detection well 621 with less loss and maintain a high S/N ratio. In an embodiment, the bottom thin wall or film 627 and the front wall 629 are light transmissive for passing light therethrough. In some embodiments, at least one of the bottom and the top of the detection well 621 includes a light transmissive thin wall or thin film for passing light therethrough. In some embodiments, no optical components with optical power are applied in the system, in other words, except the optical thin film or wall, there is no lens or mirror in the system.

Figure 11:
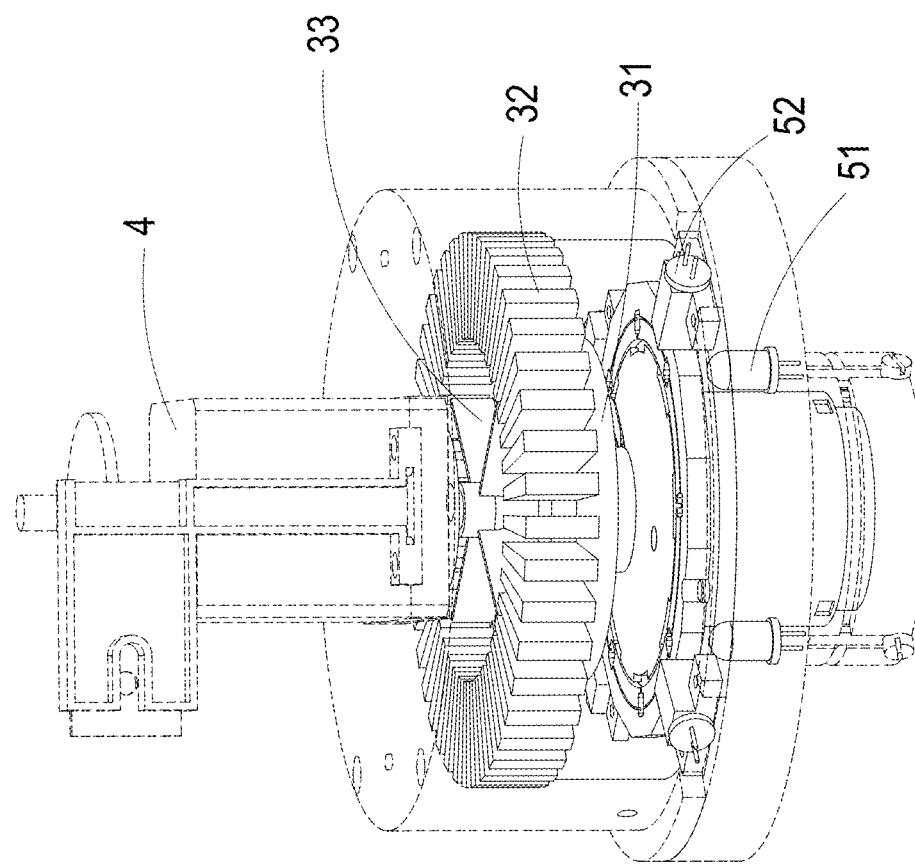
FIG. 11 shows the internal structures in the chamber of the nucleic acid analysis apparatus.

FIG. 11 shows the internal structures in the chamber of the nucleic acid analysis apparatus, wherein the fluid delivery unit 2 is removed and the outlines of the chamber 1 and the rotational driven unit 4 are shown by broken lines to more clearly show the internal structures in the chamber. As shown in FIGS. 2 and 11, the thermal unit 3 includes a heater 31, a heat spreader 32, and plural fan blades 33. The heat spreader 32 includes plural heat sinks surrounding the heater 31 and is mounted on the heater 31 so that the generated heat could be spread rapidly. The fan blades 33 are mounted on and driven by the rotational driven unit 4, and the rotation of the fan blades 33 generates air flow towards the heat spreader 32 to accelerate the thermal mixing within the closed chamber 1.

In some embodiments, the nucleic acid analysis apparatus 100 may be designed to amplify nucleic acid based on an isothermal method, and therefore only constant temperature(s) instead of thermal cycling among three different temperature zones would be needed. As a result, the thermal unit 3 is significantly simplified. In addition, the chamber 1 of the nucleic acid analysis apparatus 100 is designed with superior thermal insulation, and therefore the inner temperature is easily maintained. Once the chamber 1 is in a uniform temperature environment, heat loss from the detection wells 621 and sample towards the environment may be minimized. At the amplification and/or detection processes, the whole closed chamber 1 and the sample at each detection well 621 are substantially in the same temperature, regardless the cartridge 6 is in motion or in stationary.

The thermal unit 3 provides the required temperature within the chamber 1 during the operation, wherein the temperature control is independent of the number and the shape of detection wells 621. In an embodiment, the thermal unit 3 further includes at least one temperature sensor to control the accuracy of the temperature.

In an embodiment, the thermal unit 3 heats up the sample through non-contact approaches, such as hot air convection, heat dissipating, infrared heating, microwave heating or laser heating, but not limited thereto.

Alternatively, the thermal unit 3 may heat up the sample through contact heating. In an embodiment, the thermal unit 3 is arranged at the bottom chamber 12, and the detection well 621 as well as its contained samples are directly heated by the thermal unit 3 through heat conduction.

In an embodiment, the thermal unit 3 includes detachable heaters which may contact the detection well 621 during the amplification for good heat transfer purpose, and the heaters are able to be detached from the cartridge 6, allowing the cartridge 6 in motion when necessary.

The rotational driven unit 4 is mounted on the top chamber 11. The rotational driven unit 4 is but not limited to a motor, and it may also be solenoid, manual operation, spring, clockwork or other components, and is able to clamp and rotate the cartridge 6 at predefined angles and pass each detection well 621 in alignment with each optical unit 5 sequentially. In an embodiment, the rotational driven unit 4 includes a step motor, which is able to drive both rotations of the fan blades 33 and the cartridge 6 in different patterns.

Figure 12:
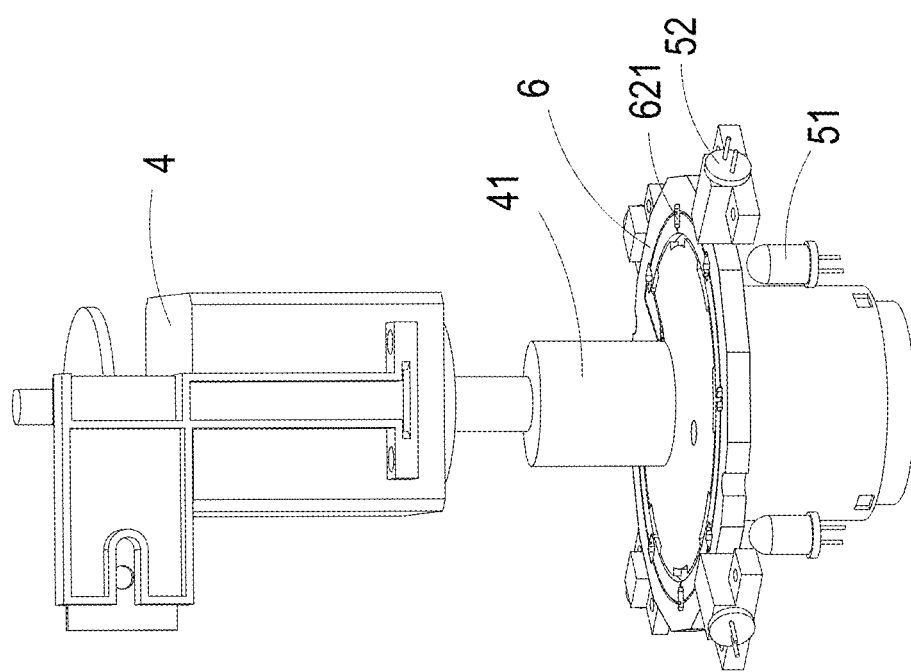
FIG. 12 shows the structures of the rotational driven unit, the cartridge, and the optical unit.

FIG. 12 shows the structures of the rotational driven unit 4, the cartridge 6, and the optical unit 5. As shown in FIGS. 2 and 12, the rotational driven unit 4 further includes a cartridge clamp 41 used to clamp and rotate the cartridge 6. Once the cartridge 6 is clamped, it is able to rotate within the chamber 1 and be actuated by the rotational driven unit 4. Various mechanisms are capable of realizing cartridge clamp and release on demand. In an embodiment, the cartridge clamp 41 includes a magnetic component 411, and for example, the magnetic component 411 includes a magnet. Accordingly, a magnetic material 64 is embedded within the reaction chip 62 of the cartridge 6 during the manufacture of the cartridge 6, and for example, the magnetic material 64 includes iron. When the cartridge 6 is locked by the clip 14, a tiny gap around 0.5 mm to 3 mm exists between the top surface of the cartridge 6 and the cartridge clamp 41. In this situation, the rotational driven unit 4 may actuate the fan blades 33 only. Once the cartridge 6 is released from the clip 14, the magnetic force between the magnetic component 411 and the magnetic material 64 attracts the cartridge 6 to move toward the cartridge clamp 41, so that the cartridge 6 is held and fixed by the cartridge clamp 41 of the rotational driven unit 4. Thus, the cartridge 6 could freely rotate within the chamber 1 during the nucleic acid amplification and/or detection, and there is a tiny gap between the bottom surface of the cartridge 6 and the fluid delivery unit 2.

In other embodiments, the cartridge clamp 41 may also be solenoid, screw, nut, press-fitted parts, frictional parts, grip, pincer, epoxy, chemical bonding or other types as long as it is able to clamp the cartridge 6 on demand.

In an embodiment, the nucleic acid analysis apparatus 100 includes multiple optical units 5. The optical unit 5 has optical components such as light source, lens, filter, and optical detector to realize the optical detection so that the sample could be detected in real time during the nucleic acid amplification. As shown in FIGS. 11 and 12, the optical unit 5 includes at least one light source 51 and at least one optical detector 52. The light source 51, such as LED, is embedded within the chamber 1. During the operation, each light source 51 aligns to one of the detection wells 621 of the cartridge 6 in order to offer effective illumination for detection. Once the cartridge 6 is clamped, the optical detector 52, such as photodiode, is in line with one of the detection wells 621 on the cartridge 6, and therefore the results of nucleic acid analysis are interpreted. The rotation of the cartridge 6 allows each detection well 621 passing through various optical units 5 sequentially. In an embodiment, each optical unit 5 could offer a unique wavelength of illumination so as to provide different colors for fluorescent based detection, and thus, the nucleic acid analysis apparatus 100 can detect multiple targets simultaneously and realize multiplexing detection.

In an embodiment, the nucleic acid analysis apparatus 100 includes a controller, which controls the operations of the fluid delivery unit 2, the thermal unit 3, the rotational driven unit 4, and the optical unit 5. In an embodiment, the controller may also control the release of the clip 14.

By utilizing the isothermal based amplification, the overall system is significantly simplified, and thus, the nucleic acid analysis apparatus 100 can be compact designed and is even smaller than a common teacup. In an embodiment, the nucleic acid analysis apparatus 100 has a height ranged between 100 mm and 120 mm and a width ranged between 80 mm and 100 mm. Since the nucleic acid analysis apparatus 100 is cup sized, it is portable and suitable for POC diagnostics.

In one embodiment, the nucleic acid analysis apparatus 100 is designed for isothermal based amplification, and thus can be used to perform all isothermal amplification methods, such as nucleic acid sequence-based amplification (NASBA), strand displacement amplification (SDA), helicase-dependent amplification (HDA), loop-mediated isothermal amplification (LAMP), recombinase polymerase amplification (RPA), and nicking enzyme amplification reaction (NEAR).

Figure 13:
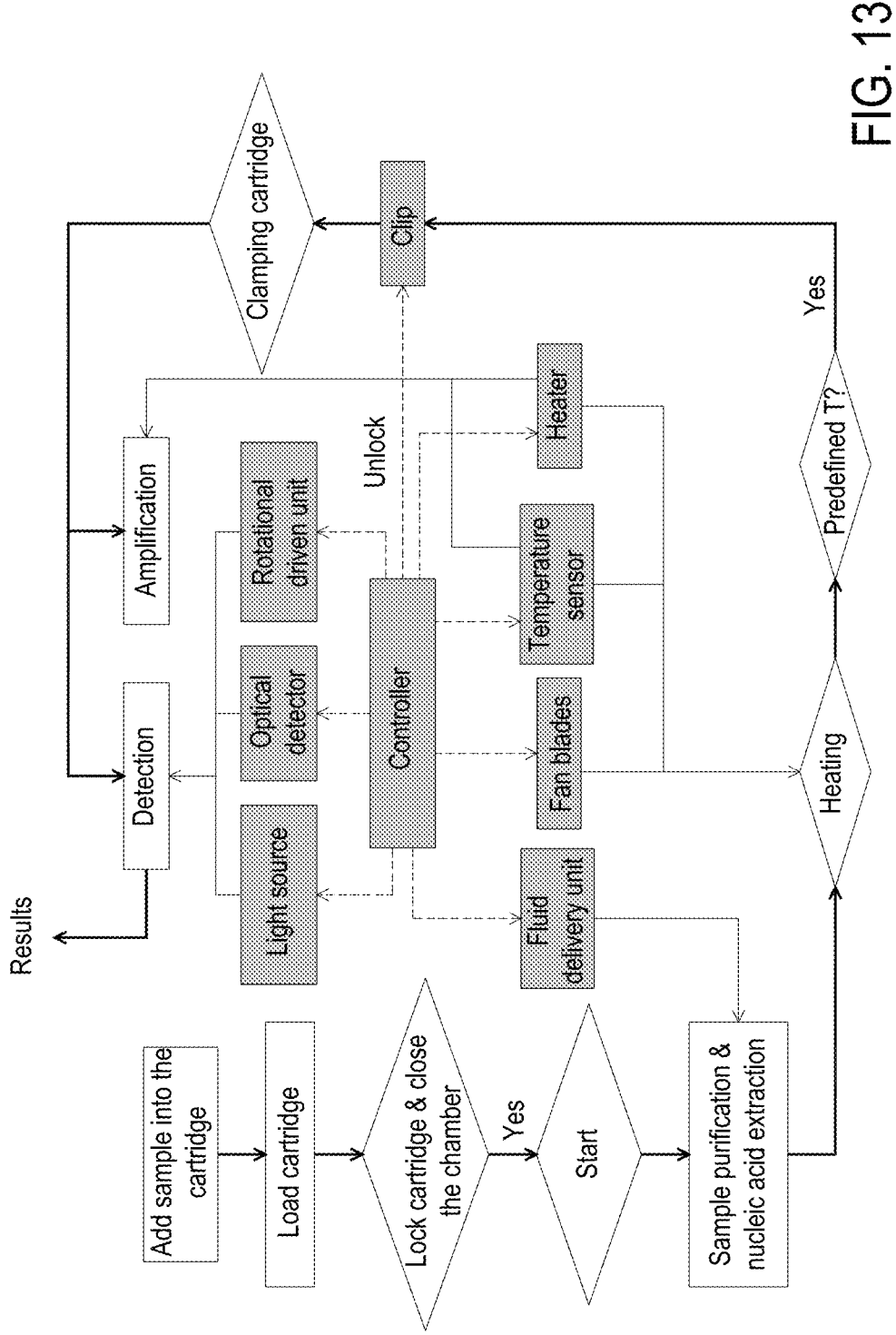
FIG. 13 shows the flow chart of the operation of the nucleic acid analysis apparatus.

FIG. 13 shows the flow chart of the operation of the nucleic acid analysis apparatus. The thick arrows indicate the procedure of the operation. The hollow boxes indicate several main actions, and the hollow diamonds show main steps to complete the operation. The gray boxes indicate core hardware components of the apparatus. Communications from the controller to the hardware components are illustrated by dashed arrows, and the responses of the hardware components to yield predefined functionalities are illustrated by thin arrows. The operation procedures of the nucleic acid analysis apparatus 100 are described as follows with reference to FIGS. 1 to 13.

In the first step, manual operations are performed. The top chamber 11 of the nucleic acid analysis apparatus 100 is opened. The sample is added into the cartridge 6 through the sample loading hole on the reaction chip 62, wherein the reagents for the sample purification and the nucleic acid extraction are preloaded in the chambers 631 of the cartridge body 63. After the sample is added to the cartridge 6, the cartridge 6 is loaded into the bottom chamber 12. Once the cartridge 6 is placed into the cavity 121 of the bottom chamber 12, the positioning component 17 on the bottom chamber 12 helps the cartridge 6 self-aligned with the fluid delivery unit 2. In addition, by pushing the cartridge 6 downwardly, the cartridge 6 is locked by the clip 14 and forced to contact the fluid delivery unit 2 tightly. Then the top chamber 11 is closed to start sample processing.

In the second step, the sample purification and the nucleic acid extraction are performed. In this step, sample processing is carried out within the cartridge 6 and the reagents, such as biochemical buffers, are transported to each desired locations through the assistance of the fluid delivery unit 2. After the sample purification and the nucleic acid extraction are completed, the sample with extracted nucleic acid is dispensed to the detection wells 621 of the cartridge 6 for following nucleic acid amplification and/or detection.

In the third step, the chamber 1 is heated by the thermal unit 3. In this step, the heater 31 is turned on for heating. The rotational driven unit 4 drives the rotation of the fan blades 33 to blend the temperature inside the chamber 1 and generate air flow towards the heat spreader 32 to further accelerate the thermal mixing within the closed chamber 1. In addition, the temperature sensor is used to monitor the sample temperature.

In the fourth step, the nucleic acid amplification and the nucleic acid detection are performed. When the sample temperature reaches a predefined value, the fan blades 33 are ceased and the clip 14 is unlocked to release the cartridge 6, and meanwhile, the heater 31 is still in operation to maintain the temperature. Subsequently, the cartridge 6 is clamped by the cartridge clamp 41, and the isothermal based amplification is started. Once the cartridge 6 is clamped, it is able to rotate within the chamber 1, which is actuated by the rotational driven unit 4. The cartridge 6 is able to rotate with a certain angle so that the detection well 621 aligns with the optical unit 5 and stops for a short period (200 ms, for example) for detection. Thereby, each detection well 621 is able to pass through a series of light sources 51 with different colors, and the emitted lights are able to be detected with the optical detectors 52, such as photodiode.

After the detection is completed, the detection results may be sent to cloud or digital devices, such as PC, tablet or smart phone, through USB, Bluetooth, or wireless. The chamber 1 is opened and the cartridge 6 is discarded.

Figure 14:
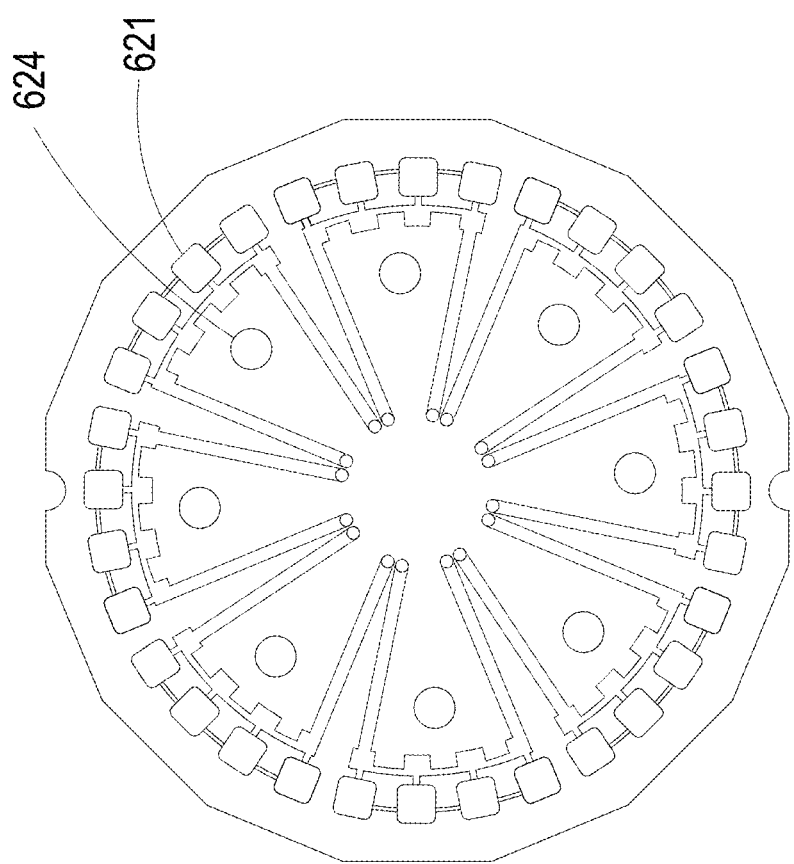
FIG. 14 shows a top view of an X-in-one cartridge capable of detecting X samples within one cartridge.
Figure 15:
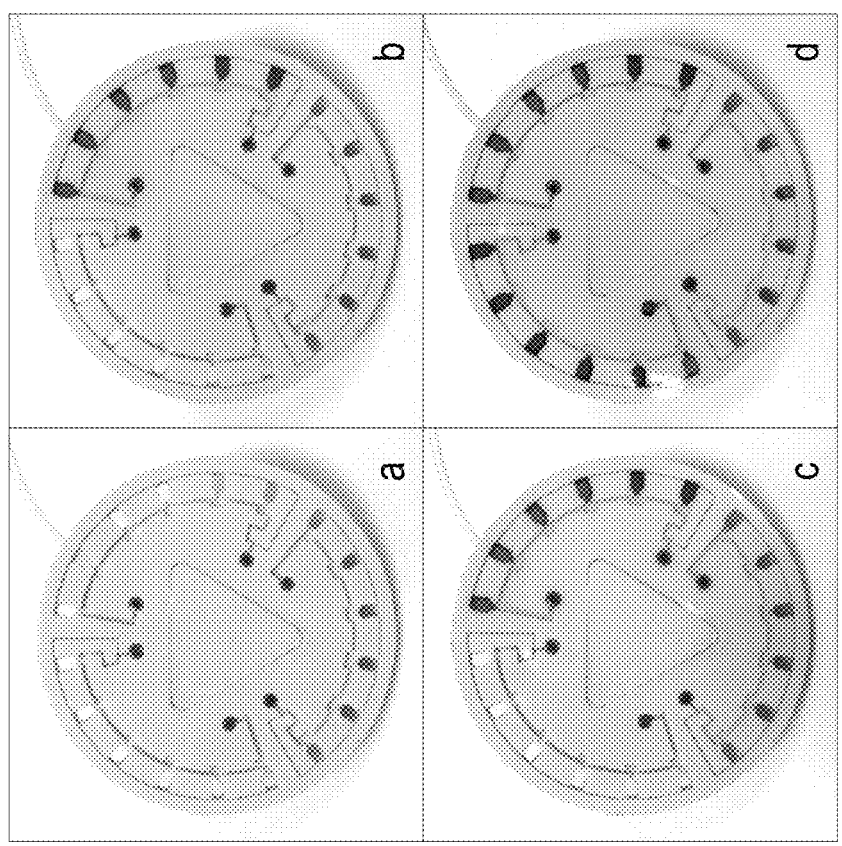
FIG. 15 shows the liquid dispensing and the oil sealing processes of a three-in-one cartridge.

In the above embodiments, the cartridge 6 is illustrated as one-in-one cartridge, which means one sample per detection. However, in some embodiments, the cartridge 6 may have more than one sample loading hole 624 and the cartridge 6 may be X-in-one cartridge, which means X samples per detection. FIG. 14 shows a top view of an X-in-one cartridge capable of detecting X samples within one cartridge, for example an eight-in-one cartridge. The reaction chip 62 includes eight sample loading holes 624 for adding eight different samples into the same cartridge 6. While inside the cartridge body 63 and the reaction chip 62, the overall space is divided into eight subparts, and each subpart is in charge of one sample processing and detection. In some embodiments, the subparts may share some common chambers, such as waste chamber. Therefore, the X-in-one cartridge allows a flexible throughput when a single cartridge is mounted in the nucleic acid analysis apparatus. Users can add several different samples into one cartridge for a panel detection without changing the apparatus, so as to have flexible throughput (1~X) without increasing hardware cost. This is an easy and cost-effective solution for middle and high throughout by using the present cartridge and apparatus. FIG. 15 shows the liquid dispensing and the oil sealing processes of a three-in-one cartridge. The cartridge space is divided into three subparts. The liquid dispensing and the oil sealing processes are conducted sequentially and clockwisely among these subparts. The dyed liquids in the three subparts represent the extractions from three different samples added into the cartridge 6.

In conclusion, the embodiment of the present invention provides an all-in-one nucleic acid analysis apparatus with isothermal based amplification, which integrates the fluid delivery unit, the thermal unit, the rotational driven unit, and the optical unit on one single device, so that the processes of sample purification, nucleic acid extraction, nucleic acid amplification, and/or nucleic acid detection may be performed on the all-in-one apparatus to realize nucleic acid analysis in real time. Therefore, the nucleic acid analysis apparatus provides an easy and fast nucleic acid analysis. Particularly, in some embodiments, the disposable flow control and processing cartridge used in the nucleic acid analysis apparatus has well-designed channel geometry to precisely control the flow direction and dynamic flow behaviors within the reaction chip, so that the sample could be sequentially and smoothly dispensed to each detection well for facilitating the following nucleic acid amplification and detection. Further, due to the arrangements of multiple detection wells and multiple optical units, both multiple-well multiplexing nucleic acid analysis and multiple color multiplexing detection are achieved. In addition, since the overall system is significantly simplified, the nucleic acid analysis apparatus can be compact designed, so it is portable and suitable for POC diagnostics. Also, the cost for nucleic acid analysis is also significantly reduced. Beside, the nucleic acid analysis apparatus has good sensitivity and specificity, and flexible throughput as well.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flow control and processing cartridge used in a nucleic acid analysis apparatus, comprising:
   a cartridge body comprising plural chambers for storing at least one sample and plural biochemical reagents and buffers, and plural channels connected with the plural chambers; and
   a reaction chip in conjunction with the cartridge body and comprising plural detection wells, at least one main fluid channel connected with the detection wells and adapted to dispense the sample into the detection wells, and at least one gas releasing channel connected with the detection wells and adapted to release gas from the detection wells, wherein the main fluid channel comprises plural wide channel parts, plural narrow channel parts, and plural well inlet channels, each of the plural wide channel parts is aligned with one of the plural detection wells and connected with the corresponding detection well through the corresponding well inlet channel, each of the plural narrow channel parts is connected between two adjacent wide channel parts, and the gas releasing channel is narrower than all channels of the main fluid channel.

2. The flow control and processing cartridge according to claim 1, wherein a flow resistance at the narrow channel part is higher than a combined flow resistance at the wide channel part and at the well inlet channel.

3. The flow control and processing cartridge according to claim 2, wherein the flow resistance at the narrow channel part is 2 to 20 times higher than the combined flow resistance at the wide channel part and at the well inlet channel.

4. The flow control and processing cartridge according to claim 1, wherein the flow resistance at the gas releasing channel is 2 to 500 times higher than the flow resistance at the narrow channel part.

5. The flow control and processing cartridge according to claim 1, wherein the well inlet channel has a smaller cross-section than the wide channel part.

6. The flow control and processing cartridge according to claim 1, wherein the reaction chip is disposed on one side of the cartridge body.

7. The flow control and processing cartridge according to claim 1, wherein each of the plural detection wells has at least one planar surface.

8. The flow control and processing cartridge according to claim 1, wherein the shape of the reaction chip is substantially a regular polygon.

9. The flow control and processing cartridge according to claim 1, wherein the reaction chip further comprises at least one sample loading hole for adding the sample into the cartridge.

10. The flow control and processing cartridge according to claim 1, wherein the reaction chip further comprises plural sample loading holes for adding different samples into the cartridge.

11. The flow control and processing cartridge according to claim 1, wherein the cartridge is mounted in a chamber of the nucleic acid analysis apparatus, and the reaction chip further comprises at least one alignment slot capable of being aligned with at least one positioning component on the chamber, wherein the positioning component includes a positioning pin.

12. The flow control and processing cartridge according to claim 1, wherein the reaction chip comprises at least one sample inlet, and the cartridge body comprises at least one channel connected to the sample inlet for transferring the sample to the reaction chip.

13. The flow control and processing cartridge according to claim 1, wherein the cartridge body further comprises plural openings at a bottom surface thereof, and the openings are communicated with the chambers through the channels.

14. The flow control and processing cartridge according to claim 1, wherein at least one of a bottom and a top of the detection well comprises a light transmissive thin wall or thin film for passing light therethrough.

15. The flow control and processing cartridge according to claim 1, wherein the detection well has a light transmissive front wall for passing light therethrough.

16. The flow control and processing cartridge according to claim 1, wherein the gas releasing channel is directly connected with the plural detection wells at locations distal from the corresponding well inlet channels.

17. The flow control and processing cartridge according to claim 1, wherein the main fluid channel and the gas releasing channel have a concentric circular arrangement.

* * * * *